(12) United States Patent
Moslander et al.

(10) Patent No.: US 6,826,581 B2
(45) Date of Patent: Nov. 30, 2004

(54) UPGRADING A DEVICE OVER A NETWORK BY DOWNLOADING RESULTS OF COMMAND EXECUTION FROM SCRIPT FILE

(75) Inventors: Joseph P. Moslander, Salt Lake City, UT (US); Steven S. Bateman, Fallbrook, CA (US)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 09/732,390

(22) Filed: Dec. 6, 2000

(65) Prior Publication Data

US 2002/0069213 A1 Jun. 6, 2002

(51) Int. Cl.[7] .............................................. G06F 17/30
(52) U.S. Cl. ...................... 707/203; 717/115; 717/173; 717/178; 707/10; 709/250
(58) Field of Search ................................. 707/1–13, 10, 707/203; 709/250, 220, 221, 223; 717/115, 168–178

(56) References Cited

U.S. PATENT DOCUMENTS

| | | | | |
|---|---|---|---|---|
| 5,163,130 A | * | 11/1992 | Hullot ......................... | 345/763 |
| 5,784,563 A | * | 7/1998 | Marshall et al. ............ | 709/221 |
| 6,008,805 A | * | 12/1999 | Land et al. ................. | 345/744 |
| 6,009,274 A | * | 12/1999 | Fletcher et al. ............. | 709/217 |
| 6,012,100 A | * | 1/2000 | Frailong et al. ............ | 709/220 |
| 6,256,635 B1 | * | 7/2001 | Arrouye et al. ............... | 707/10 |
| 6,324,654 B1 | * | 11/2001 | Wahl et al. .................. | 707/204 |
| 6,324,692 B1 | * | 11/2001 | Fiske ......................... | 717/178 |
| 6,360,366 B1 | * | 3/2002 | Heath et al. ................. | 717/178 |
| 6,370,646 B1 | * | 4/2002 | Goodman et al. .......... | 713/100 |
| 6,442,706 B1 | * | 8/2002 | Wahl et al. .................... | 714/6 |
| 6,493,871 B1 | * | 12/2002 | McGuire et al. ............ | 717/173 |
| 6,609,127 B1 | * | 8/2003 | Lee et al. ..................... | 707/10 |
| 6,725,453 B1 | * | 4/2004 | Lucas et al. ................ | 717/178 |

\* cited by examiner

Primary Examiner—Uyen Le
Assistant Examiner—Hanh Thai
(74) Attorney, Agent, or Firm—Fish & Richardson P.C.

(57) ABSTRACT

A method, performed by a remote device, of upgrading a target device. The method includes, inter alias, receiving a configurable script file from a configuration server; where the script file contains device data identifying a type of the device, commands and graphics data; identifying the target device on a network using the device data; receiving identification data from the target device; generating a user interface containing information about the target device using both the identification data and the graphics data; and upgrading the target device using the commands in accordance with information displayed on the user interface. The remote device performs upgrading by executing the commands from the script file and downloading results of command execution to the target device. The results are used to upgrade the target device.

21 Claims, 6 Drawing Sheets

UPGRADING A DEVICE OVER A NETWORK BY DOWNLOADING RESULTS OF COMMAND EXECUTION FROM SCRIPT FILE

TECHNICAL FIELD

This invention relates generally to upgrading a device over a network.

BACKGROUND

In a network context, an appliance is a network device, such as an electronic mail (e-mail) station or World Wide Web (Web) terminal, that executes software using a simple operating system to perform specific functions. From time-to-time, it may be necessary to upgrade information, such as the software or database, in an appliance in order to improve its functionality or to maintain its compatability with other network upgrades.

DETAILED DESCRIPTION

Figure 1:
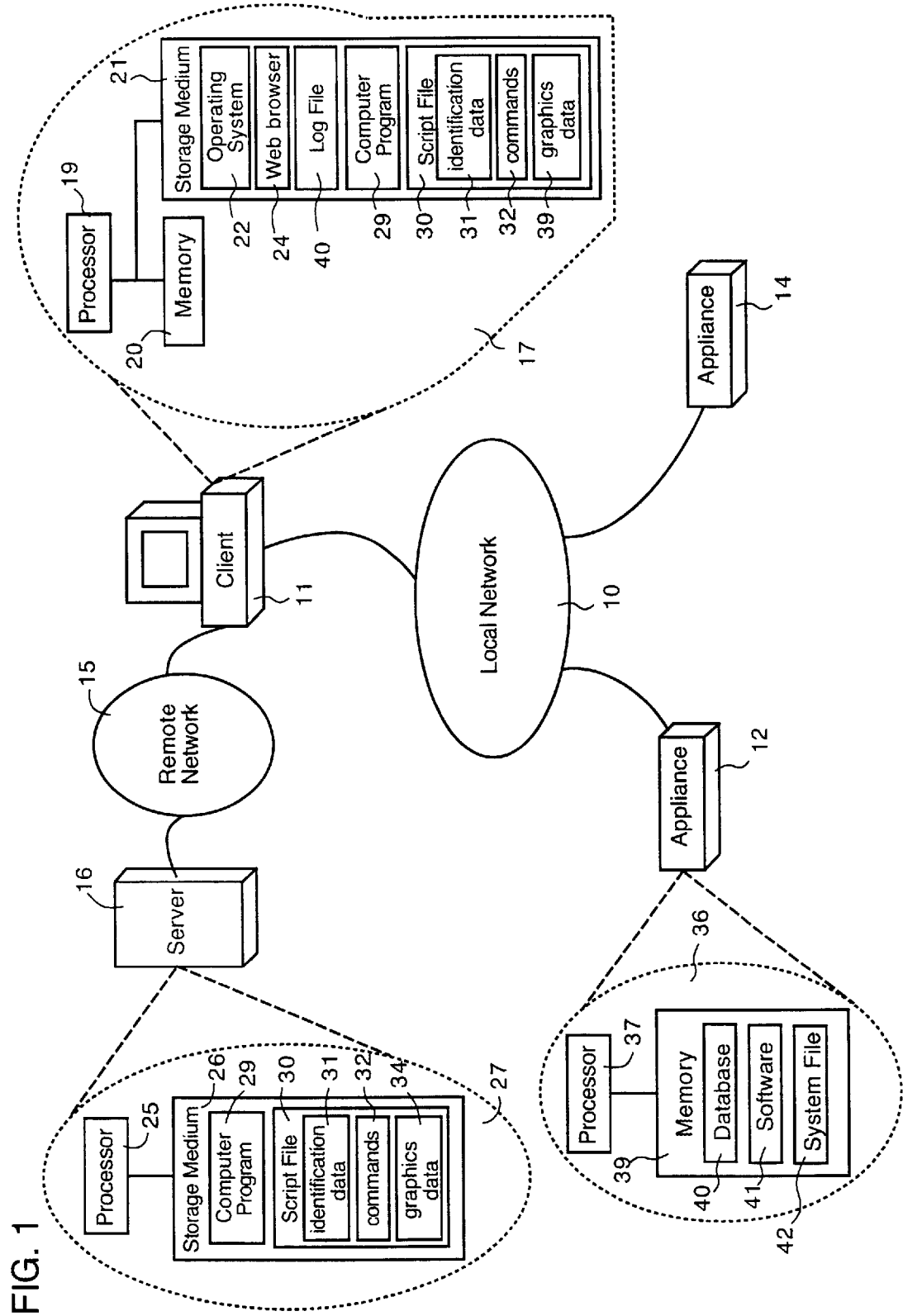
FIG. 1 is block diagram of a network.

Referring to FIG. 1, local network 10 connects client 11 to one or more appliances 12 and 14. Local network 10 may be a local area network (LAN), a wide area network (WAN), or any other type of network. Client 11 is also connected to a remote network 15, such as the Internet, which gives client 11 access to data stored on a server 16.

Client 11 is a computer, such as a personal computer (PC), mainframe and terminal, or the like. As shown in view 17, client 11 contains a processor 19, a memory 20, and a storage medium 21. Memory 20 is a random access memory (RAM) or other storage device. Storage medium 21 is a non-volatile memory, such as a computer hard disk.

Storage medium 21 stores an operating system (OS) 22, such as Microsoft® Windows98® and a Web browser, such as Microsoft® Internet Explorer® or Netscape Navigator®. Processor 19 runs OS 22 and Web browser 24 to access data stored on server 16 of remote network 15.

Server 16 is a computer, which includes a processor 25 and storage medium 26 that are similar to those of client 11 (see view 27). Storage medium 26 contains computer programs and associated script files (e.g., computer program 29 and script file 30) for use in updating appliances, such as appliances 12 and/or 14 on local network 10. Script file 30 is a textual file that contains identification data 31, commands 32, and graphics data 34. Other data may be included in the script file as well.

Identification data 31 identifies a type of appliance that is to be upgraded. For example, the identification data might specify that an Intel® e-mail station is to be upgraded. Commands 32 are computer-executable instructions for upgrading software and/or a database on the appliance(s) specified by identification data 31. The commands are run by corresponding computer program 29 to upgrade the appliance identified by identification data 31. Graphics data 34 defines a graphic representation, such as a bitmap image, of the appliance specified by the identification data. The graphics data is displayed to a user when computer program 29 is run by client 11 to upgrade an appliance. In some embodiments, graphics data 34 is omitted from script file 30.

Script file 30 is configurable in the sense that identification data 31, commands 32, and graphics data 34 can be changed at will without requiring a change in the corresponding computer program 29 that runs the script file. This simplifies the upgrade process, since upgrades can be changed without having to rewrite or recompile the computer program 29 that executes the commands.

Figure 2:
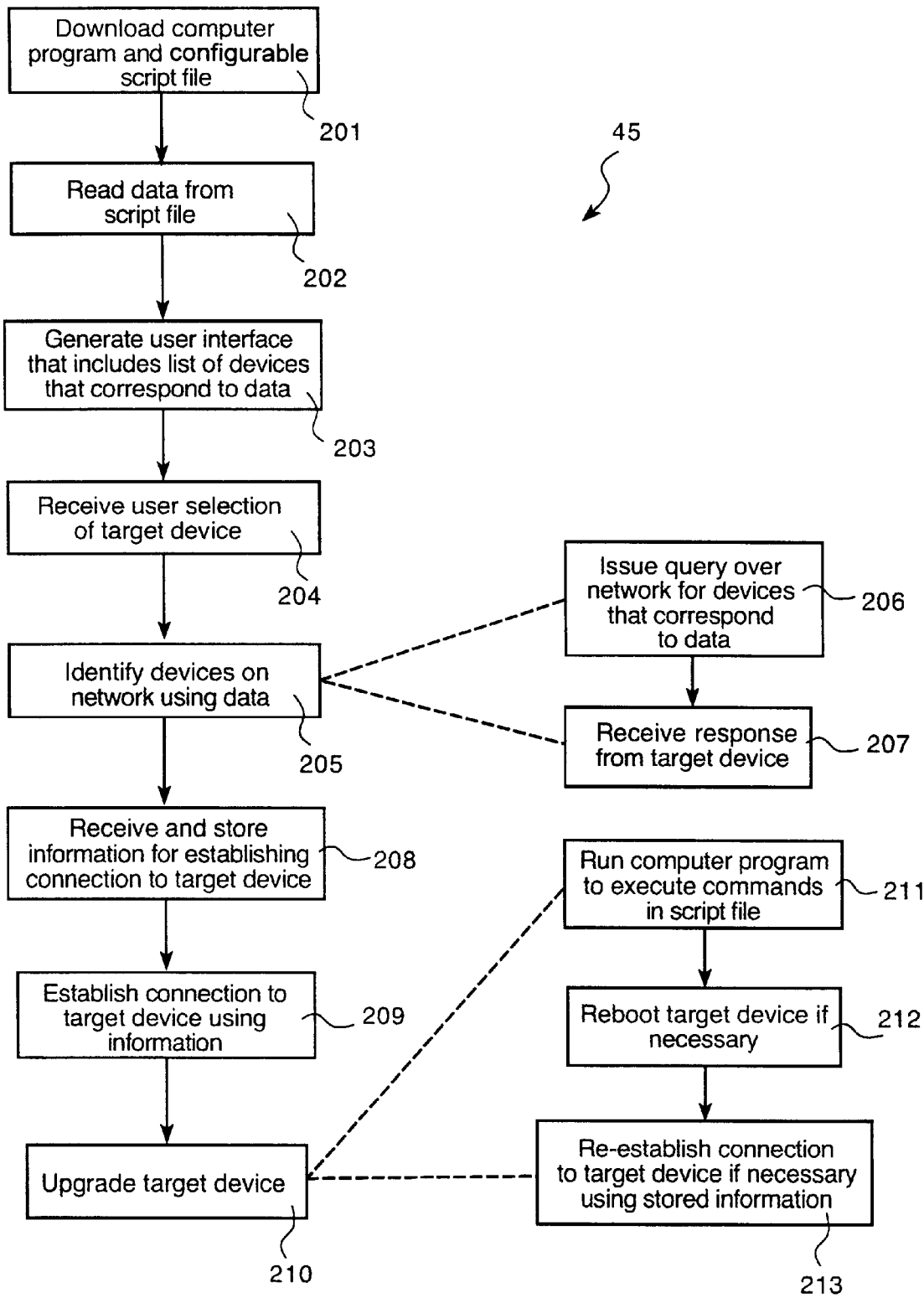
FIG. 2 is a flowchart showing a process for upgrading devices on the network.

To upgrade an appliance or set of appliances, a user (not shown) at client 11 activates Web browser 24 to connect to server 16. Client 11 downloads computer program 29 and associated script file 30 for upgrading an appliance. These may be identified, e.g., on a Web site maintained by the manufacturer of the appliance or a manufacturer of software for the appliance. In any case, computer program 29 and script file 30 are downloaded to storage medium 21 (or any other storage location) in client 11, as shown in FIG. 1. A process for upgrading appliances from client 11 using computer program 29 and script file 30 is described in FIG. 2 below.

As noted above, an appliance may be any type of device that includes a database and/or software for use in its operation. Shown in view 36 is a general architecture for appliance 12. This architecture may apply for any appliance on local network 10. The architecture includes a processor 37 and a memory 39. Memory 39 stores a database 40, software 41, and a system file 42. Other information that requires upgrading may also be stored; likewise, some of the information shown in FIG. 1 may be omitted. System file 42 includes executable instructions, data and parameters for configuring, initializing, and operating appliance 12. Processor 37 executes software 41 and/or system file 42 and uses database 40 to run appliance 12. Software 41, system file 42 and/or database 40 require periodic upgrades. They are upgraded by client 11, which runs process 45 (FIG. 2) to effect the upgrades.

Process 45 connects to server 16 and downloads (201) computer program 29 and associated script file 30 for upgrading a specific type of appliance. In some embodiments, the script file alone can be downloaded, e.g., if computer program 29 is already on client 11 and has not changed since it was previously downloaded. Client 11 receives computer program 29 and script file 30 and stores them on storage medium 21, as shown in FIG. 1. When program 29 is executed, program 29 and script file 30 are loaded into memory 20. Client 11 executes computer program 29 to perform the remainder of the upgrading process 45.

Figure 3:
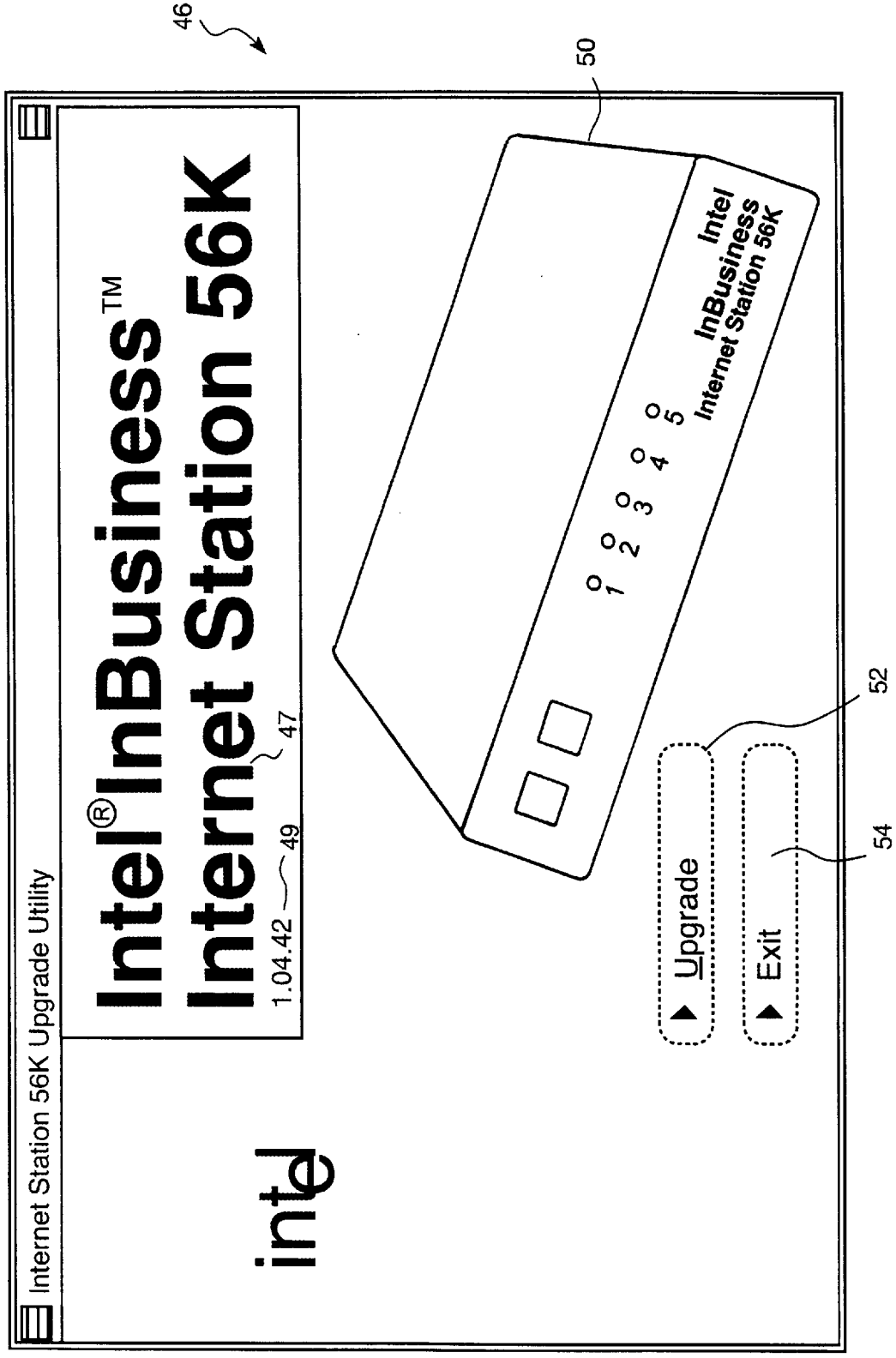
FIGS. 3 to 6 are screen shots of graphical user interfaces generated during the upgrading process.
Figure 4:
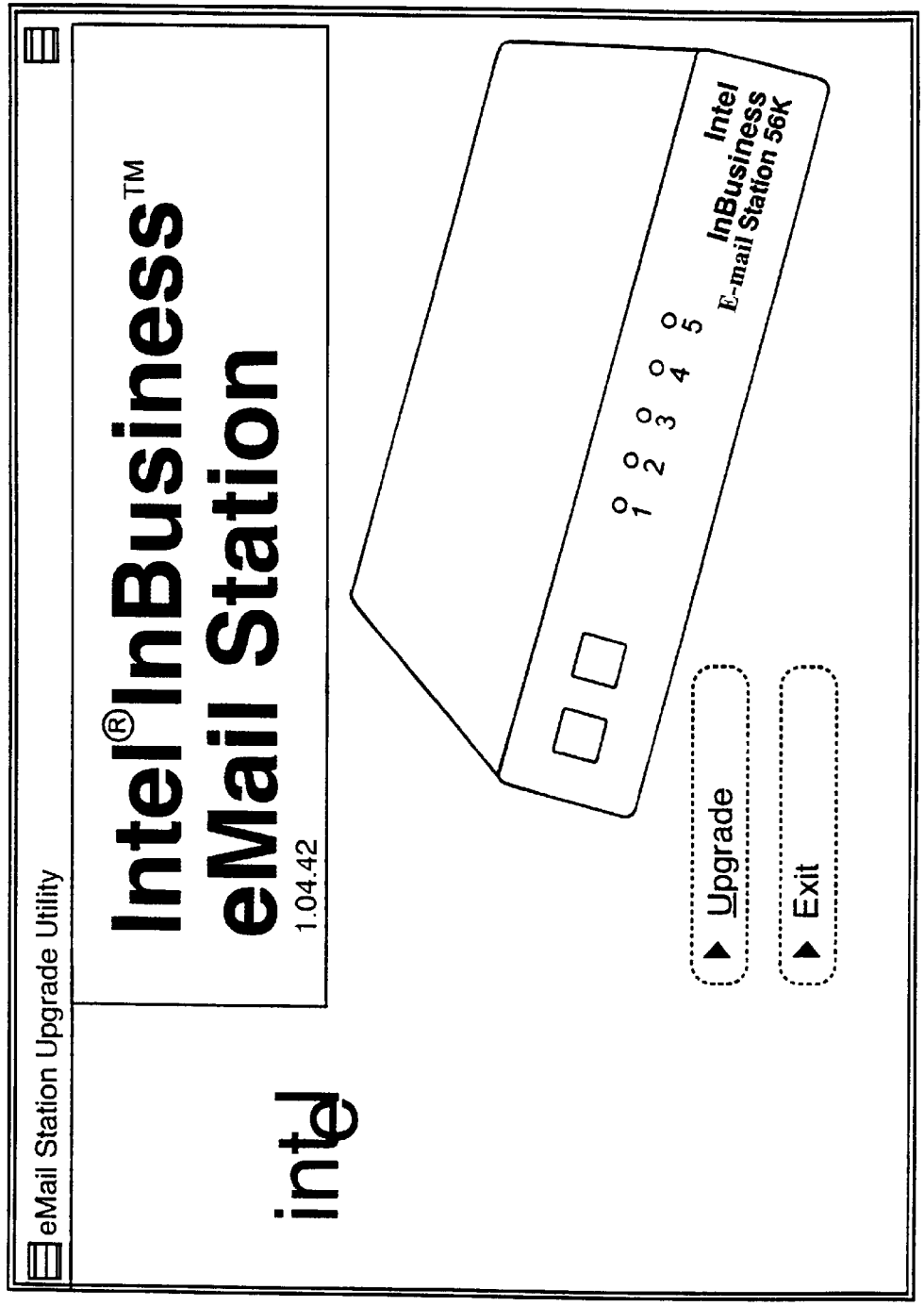

Process 45 reads (202) identification data 31 and graphics data 34 from script file 30 and generates (203) a graphical user interface based on that data. An example of a user interface 46 generated by process 45 is shown in FIG. 3. User interface 46 includes information such as the name 47 of the appliance being upgraded, the version number 49 of software of the upgrade, and an image 50 of the appliance. Name 47 and version number 49 are generated from identification data 31 in script file 30 and image 50 is generated from graphics data 34 in script file 30. FIG. 4 shows an alternative user interface 51 that was generated using different graphics data than user interface 46.

In FIG. 3, a user selects upgrade option 52 to upgrade the software, database and/or system file in all appliances of the type identified by user interface 46. Exit option 54 ends the upgrading process. Process 45 receives (204) the user's selection to upgrade the target appliance. In response, process 45 identifies (205) appliance(s) on local network 10 that correspond to those specified by identification data 31. To do this, process 45 issues (206) a query over local network 10 for such appliances. Appliances on local network 10 receive the query and determine whether they match criteria specified in the query, such as the name, version, or type of appliance that is to be upgraded. One or more target appliance(s) that match the criteria issue a response over local network 10, which process 45 receives (207). The response includes a code or the like identifying the target device as one that matches the criteria.

Figure 5:
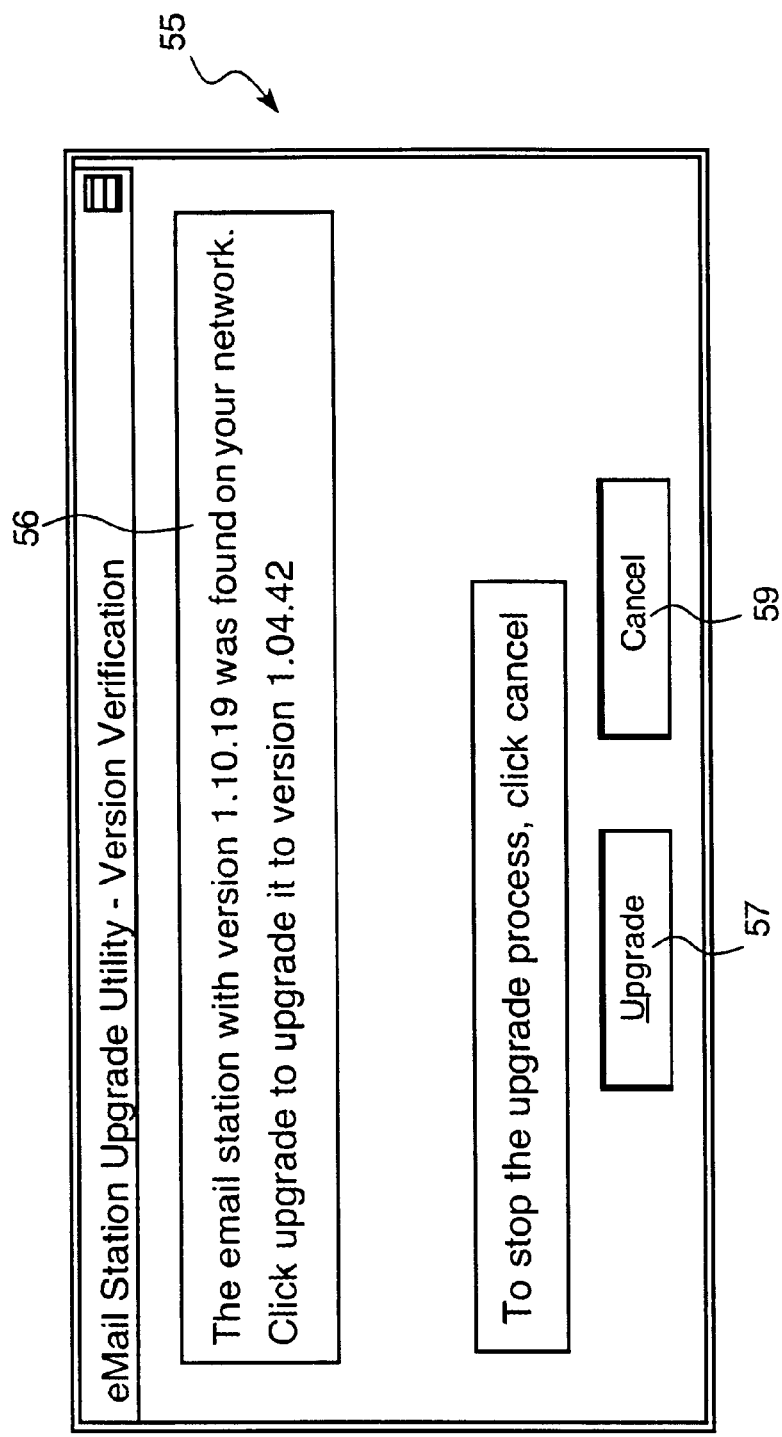

Along with the response, a target appliance 12 provides information about itself. This information includes the local network address of the appliance. The information may also include the current version number of the software installed on target appliance 12 and/or any other available identifying information. Process 45 generates another user interface 55 (FIG. 5) and displays that user interface on client 11. User interface 55 includes the information 56 provided by the target appliance 12, an option 57 to upgrade the target appliance to a new version of, e.g., software, and an option 59 to cancel the upgrading process.

If the user selects upgrade option 57, process 45 prompts the user for information necessary to establish a connection with target appliance 12. This information may include, for example, a username and password that enable access to the appliance. Process 45 receives this information and stores (208) it in memory. Process 45 also uses the information to establish (209) and maintain connections with target appliance 12. The connections are an FTP (File Transfer Protocol) and Windows® socket connections that are set up using the network address provided by the appliance in response to the query (206). The FTP connection is used to transfer files to (or from) the client 11. The socket connection is used to send commands to the client 11 or get information (such as the current version number) from the appliance 12.

Once the connections have been established, process 45 upgrades (210) the target appliance. Any feature of the target appliance, e.g., software, system file, database, operational parameters, etc. may be upgraded, depending upon the commands stored in script file 30. Process 45 upgrades the target device by executing (211) the commands in the script file. These commands may include instructions for changing database values 40 on the appliance 12 and/or transferring a new version of a system file 42 from the client 11 to the appliance 12.

Figure 6:

During the upgrading process, user interface 60 (FIG. 6), containing status bars 61 and 62, is displayed on client 11. Status bar 61 shows the progress of the upgrade as a whole and status bar 62 shows the progress of individual upgrade tasks (i.e., software, system file, database, operational parameters) on appliance 12. Thus, status bar 62 changes for each new task that is being upgraded.

During upgrading, it is often necessary to re-boot (212) the target appliance 12 and to re-establish (213) connections with that appliance. Process 45 reboots target appliance 12 and re-establishes connections (FTP and socket) using the stored information, e.g., the username and password. As a result, connection can be re-established automatically, without requiring any additional input from the user at client 11.

Process 45 also keeps track of errors that occur during the upgrading process and stores information relating to the upgrading process in a log file 70, e.g., in storage medium 21. For example, the log file contains information relating to errors in the upgrading process, such as unexecutable commands and the inability to find a file to send to the appliance.

If multiple devices are upgraded using process 45, the devices may be upgraded serially or in parallel. For serial upgrades, the appliances may be upgraded in the order that they respond to the query (206) or according to pre-specified criteria, such as an order of priority stored on client 11.

Although a personal computer is shown in FIG. 1, process 45 is not limited to use with any particular hardware or software configuration; it may find applicability in any computing or processing environment. For example, process 45 can be used with a personal digital assistant (PDA) or other hand-held computer. Process 45 may be implemented in hardware, software, or a combination of the two. For example, process 45 may be implemented using logic gates such as NAND and NOR gates, programmable logic such as a field programmable gate array (FPGA), and/or application-specific integrated circuits (ASICs).

Process 45 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform process 45 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 45. Process 45 may also be implemented as a computer-readable storage medium, configured with a computer program, where, upon execution, instructions in the computer program cause the computer to operate in accordance with process 45.

Other embodiments not described herein are also within the scope of the following claims.

What is claimed is:

1. A method, performed by a remote device, of upgrading a target device, the method comprising:

receiving a configurable script file from a configuration server, the script file containing device data identifying a type of device, commands, and graphics data;

identifying the target device on a network using the device data, wherein identifying the target device comprises issuing a query over the network for devices that correspond to the device data in the script file, and receiving a response to the query from the target device;

receiving identification data from the target device, the identification data identifying software and data on the target device that can be upgraded, the identification data identifying a current version of the software on the target device;

generating a user interface containing information about the target device using both the identification data and the graphics data; and upgrading the target device using the commands in accordance with information input via the user interface, wherein upgrading comprises the remote device executing the commands from the script file and downloading results of command execution to the target device, the results being used to upgrade the target device.

2. The method of claim 1, wherein upgrading comprises upgrading software and/or a database on the target device.

3. The method of claim 1, wherein the commands comprise instructions for upgrading software and/or a database on the target device.

4. The method of claim 1, further comprising:
selecting upgrading for the target device via the user interface.

5. The method of claim 1, wherein the response comprises a code that identifies the target device as corresponding to the data in the script file.

6. The method of claim 1, further comprising:
establishing a connection with the target device prior to upgrading the device;
storing information for establishing the connection; and
re-establishing the connection with the target device using the stored information after the device is upgraded.

7. The method of claim 1, further comprising:
maintaining a log file that contains a record of the upgrading process.

8. An article comprising:
a readable medium that stores executable instructions for upgrading a target device, the instructions causing a machine to:
receive a configurable script file from a configuration server, the script file containing device data identifying a type of device, commands, and graphics data;
identify the target device on a network using the device data, wherein identifying the target device comprises issuing a query over the network for devices that correspond to the device data in the script file, and receiving a response to the query from the target device;
receive identification data from the target device, the identification data identifying software and data on the target device that can be upgraded, the identification data identifying a current version of the software on the target device;
generate a user interface containing information about the target device using both the identification data and the graphics data; and
upgrade the target device using the commands in accordance with information input via the user interface, wherein upgrading comprises the machine executing the commands from the script file and downloading results of command execution to the target device, the results being used to upgrade the target device.

9. The article of claim 8, wherein upgrading comprises upgrading software and/or a database on the target device.

10. The article of claim 8, wherein the commands comprise instructions for upgrading software and/or a database on the target device.

11. The article of claim 8, further comprising instructions that cause the machine to:
select upgrading for the target device via the user interface.

12. The article of claim 8, wherein the response comprises a code that identifies the target device as corresponding to the data in the script file.

13. The article of claim 8, further comprising instructions that cause the machine to:
establish a connection with the target device prior to upgrading the device;
store information for establishing the connection; and
re-establish the connection with the target device using the stored information after the device is upgraded.

14. The article of claim 8, further comprising instructions that cause the machine to:
maintain a log file that contains a record of the upgrading process.

15. An apparatus which upgrades a target device, comprising:
a memory that stores executable instructions; and
a processor that executes the instructions to:
receive a configurable script file from a configuration server, the script file containing device data identifying a type of device, commands, and graphics data;
identify the target device on a network using the device data, wherein identifying the target device comprises issuing a query over the network for devices that correspond to the device data in the script file, and receiving a response to the query from the target device;
receive identification data from the target device, the identification data identifying software and data on the target device that can be upgraded, the identification data identifying a current version of the software on the target device;
generate a user interface containing information about the target device using both the identification data and the graphics data; and
upgrade the target device using the commands in accordance with information input via the user interface, wherein upgrading comprises the processor executing the commands from the script file and downloading results of command execution to the target device, the results being used to upgrade the target device.

16. The apparatus of claim 15, wherein upgrading comprises upgrading software and/or a database on the target device.

17. The apparatus of claim 15, wherein the commands comprise instructions for upgrading software and/or a database on the target device.

18. The apparatus of claim 15, wherein the processor executes instructions to:
select upgrading for the target device.

19. The apparatus of claim 15, wherein the response comprises a code that identifies the target device as corresponding to the data in the script file.

20. The apparatus of claim 15, wherein the processor executes instructions to:
establish a connection with the target device prior to upgrading the device;
store information for establishing the connection; and
re-establish the connection with the target device using the stored information after the device is upgraded.

21. The apparatus of claim 15, wherein the processor executes instructions to:
maintain a log file that contains a record of the upgrading process.

* * * * *